(12) United States Patent
Dungworth et al.

(10) Patent No.: US 7,544,402 B2
(45) Date of Patent: Jun. 9, 2009

(54) INK JET RECORDING MEDIUM

(75) Inventors: Howard Dungworth, Halifax (GB); Andrew Naisby, Yorktown Heights, NY (US); Joseph Suhadolnik, Yorktown Heights, NY (US); David A. Yale, White Plains, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 696 days.

(21) Appl. No.: 10/887,197

(22) Filed: Jul. 8, 2004

(65) Prior Publication Data

US 2005/0008795 A1   Jan. 13, 2005

Related U.S. Application Data

(60) Provisional application No. 60/486,060, filed on Jul. 10, 2003.

(51) Int. Cl.
*B41M 5/50* (2006.01)
(52) U.S. Cl. .............. 428/32.29; 428/32.24; 428/32.38
(58) Field of Classification Search ........................ None
See application file for complete search history.

(56) References Cited

U.S. PATENT DOCUMENTS

| | | | |
|---|---|---|---|
| 3,669,939 A | 6/1972 | Baker et al. | 260/78 |
| 3,671,502 A * | 6/1972 | Samour et al. | 526/287 |
| 4,503,111 A | 3/1985 | Jaeger et al. | 428/195 |
| 4,575,465 A | 3/1986 | Viola | 427/261 |
| 4,935,307 A | 6/1990 | Iqbal et al. | 428/500 |
| 5,206,071 A | 4/1993 | Atherton et al. | 428/195 |
| 5,472,757 A * | 12/1995 | Ogawa et al. | 428/32.24 |
| 5,891,232 A | 4/1999 | Moffatt et al. | 106/31.89 |
| 6,096,826 A | 8/2000 | Rabasco et al. | 525/61 |
| 6,127,037 A | 10/2000 | Sargeant et al. | 428/411.1 |
| 6,133,391 A * | 10/2000 | Nielson et al. | 206/524 |
| 6,313,246 B1 * | 11/2001 | Carter et al. | 526/258 |
| 6,444,758 B2 | 9/2002 | McNamara et al. | 525/302 |
| 6,534,157 B1 | 3/2003 | Baker et al. | 428/195 |

FOREIGN PATENT DOCUMENTS

| | | |
|---|---|---|
| EP | 0869010 | 10/1998 |
| JP | 2000-272233 | 10/2000 |
| WO | 03/037641 | 5/2003 |

* cited by examiner

*Primary Examiner*—Bruce H Hess
(74) *Attorney, Agent, or Firm*—Tyler A. Stevenson

(57) ABSTRACT

An ink jet recording media system is described which comprises at least one coating layer that comprises a zwitterionic copolymer or cooligomer, which copolymer or cooligomer comprises monomer units derived from at least one monomer selected from the group consisting of the zwitterionic monomers and at least one monomer selected from the group consisting of the hydroxy functional monomers and etherified hydroxy functional monomers. The media system exhibits fast dry times, excellent image quality, low levels of glycol smear, low color coalescence and excellent light fastness.

21 Claims, No Drawings

INK JET RECORDING MEDIUM

This application claims benefit under 35 USC 119(e) of U.S. provisional app. No. 60/486,060, filed Jul. 10, 2003.

This invention relates to ink jet recording media, in particular to ink jet coating layers that comprise certain zwitterionic copolymers or cooligomers which comprise monomer units derived from hydroxy functional monomers or etherified hydroxy functional monomers.

BACKGROUND OF THE INVENTION

Ink jet printing technology is used for example for presentation (transparency), graphic arts, engineering drawing and home office applications. The performance requirements for ink jet recording media used for these applications include efficient ink absorption, fast drying, good colorfastness, high image resolution, archivability and curl performance.

The individual layers that receive ink jet ink images are referred to as ink jet media or ink jet receivers. Ink jet media may simply consist or cellulosic fiber paper or of cellulosic fibers and a filler in order that inks may be absorbed in the space between fibers.

Ink jet recording papers may also be of the coated type, which consists for example of a paper (or support), an ink-receptive layer or ink-absorbing layer or layers, and optionally a protective coating layer. The ink-receptive layer is the ink-receiving or image drying layer. Thin protective coating layers are typically employed to provide physical protection for the underlying layer or to protect the image. Protective layers may reduce tackiness, provide a glossy appearance, and like other layers, offer an ink-receptive surface that may serve as a carrier for specific components of the ink.

A barrier layer between a paper support and the ink receptive layer or layers is also typically employed.

Attempts have been made to employ certain polymers or blends of polymers as components of ink jet recording media. In general, blends are used to find the proper balance of ink absorption, dry time and image permanence.

U.S. Pat. No. 4,503,111 teaches a recording media which is a coating that comprises a polyvinylpyrrolidone and a matrix-forming hydrophilic polymer selected from gelatin and polyvinyl alcohol.

U.S. Pat. No. 4,575,465 discloses ink jet transparencies that comprise a transparent support carrying a layer comprising a vinylpyridine/vinylbenzyl quaternary salt copolymer and a hydrophilic polymer selected from gelatin, polyvinyl alcohol and hydroxypropyl cellulose.

U.S. Pat. No. 4,935,307 discloses an ink receptive layer that comprises (a) at least one water absorbing, hydrophilic polymeric material, (b) at least one hydrophobic polymeric material incorporating acid functional groups and (c) at least one polyethylene glycol.

U.S. Pat. No. 5,206,071 teaches an ink jet film composite comprising a support, a water-insoluble, water-absorptive and ink-receptive matrix layer, which matrix layer comprises a hydrogel complex and a polymeric high molecular weight quaternary ammonium salt.

U.S. Pat. No. 6,096,826 teaches the use of piperidone modified poly(vinyl alcohol) in ink jet paper coating applications.

U.S. Pat. No. 6,127,037 teaches an ink jet recording media layer that comprises polyalkyl or polyphenyl oxazoline polymers in addition to a hydrophilic, water-insoluble polymer or copolymer.

WO 0037259 teaches ink jet media comprising a support, an ink-receptive layer and a top layer that comprises a polymer that contains both a hydrophilic component and a hydrophobic component, or a mixture of two or more such polymers.

EP 0869010 discloses ink-receiving layers in ink jet media that comprise at least one copolymer containing primary or secondary amino groups and vinyl ester derived hydroxy groups. Monomers leading to the hydroxy containing group are vinyl esters such as vinyl propionate. Monomers leading to the amino containing group are vinyl amides.

WO 03/037641 teaches ink jet media that comprises zwitterionic polymers or oligomers.

It has been found that certain zwitterionic copolymers or cooligomers that comprise monomer units derived from zwitterionic monomers and hydroxy functional monomers or etherified hydroxy functional monomers, provide for superior ink jet media when incorporated therein. The ink jet media, which receives ink jet ink, is provided fast dry times, excellent image quality, low levels of glycol smear, low color coalescence and excellent lightfastness.

DETAILED DESCRIPTION

The present invention relates to an ink jet recording media system that comprises a support and one or more coating layers thereon, wherein at least one coating layer comprises a zwitterionic copolymer or cooligomer that comprises monomer units derived from at least one monomer selected from the group consisting of the zwitterionic monomers and at least one monomer selected from the group consisting of the hydroxy functional monomers and etherified hydroxy functional monomers.

For the purposes of this invention, the terms "ink jet media", "ink jet recording media" or "ink jet media system" or "ink jet recording media system" refers to the entire composition which receives the ink jet ink, or likewise also refers to any individual layers or combinations of individual layers of the entire composition. These terms also refer to these compositions after printing with ink jet ink, that is, further comprising ink jet ink.

The term "ink receptive layer" means the ink-receiving or image-forming layer. The ink receptive layer can be considered as a sponge layer intended for the absorption of the ink.

The term "protective coating layer" means a top coating layer of the ink jet media system, or overcoat layer, that may be employed to provide specific properties as outlined above. Protective coating layers are typically thin in comparison to the ink-receptive layer. The protective coating layer is the outermost layer, and must allow for ink penetration or may be applied in a subsequent lamination step.

The term "support" refers to the base substrate of the ink jet media, for example paper itself. The present supports are naturally occurring materials or are synthetic.

The term "monomer units derived from" means the starting monomer is reacted into, and thus is part of, the finished copolymer or cooligomer. Each individual reacted monomer molecule is a "monomer unit" when part of a copolymer or cooligomer.

Zwitterionic polymers and copolymers are disclosed for example in U.S. Pat. No. 6,313,246, and U.S. patent application Nos. 60/336,280, 60/338,534 and 60/406,441, filed Nov. 2, 2001, Nov. 29, 2001 and Aug.28, 2002, respectively. The relevant disclosures of these references are hereby incorporated by reference. The present zwitterionic copolymers and cooligomers are similar and further require monomer units derived from at least one hydroxy functional monomer or at least one etherified hydroxy functional monomer.

The present zwitterionic copolymers or cooligomers comprise for example from about 99.9 to about 0.1 weight percent monomer units derived from at least one monomer selected from the group consisting of the zwitterionic monomers, about 0.1 to about 25 weight percent monomer units derived from at least one monomer selected from the group consisting of the hydroxy functional monomers and etherified hydroxy functional monomers, and from 0 to about 99.8 weight percent monomer units derived from at least one further ethylenically unsaturated monomer.

For example, the present zwitterionic copolymers or cooligomers comprise from about 0.1 to about 10 weight percent monomer units derived from at least one monomer selected from the group consisting of the hydroxy functional monomers and etherified hydroxy functional monomers. For instance, the present zwitterionic copolymers or cooligomers comprise from about 1 to about 5 weight percent, for instance from about 2 to about 5 weight percent, or about 2.5 weight percent monomer units derived from at least one monomer selected from the group consisting of the hydroxy functional monomers and etherified hydroxy functional monomers.

The weight percent monomer units is based on the weight of the polymer. That is, it does not include other ingredients of an emulsion polymer such as surfactant, initiator, solvent, biocides, and the like.

The present zwitterionic copolymers or cooligomers comprise monomer units derived from one or more than one monomer selected from the group consisting of the zwitterionic monomers. The copolymers or cooligomers comprise monomer units derived from one or more than one monomer selected from the group consisting of the hydroxy functional monomers and etherified hydroxy functional monomers. The copolymers and cooligomers optionally comprise monomer units derived from one or more than one further ethylenically unsaturated monomer.

The monomers according to this invention are polymerizable allylic, vinylic or acrylic compounds. That is, they are ethylenically unsaturated.

The present zwitterionic monomers are for example selected from the formulae

wherein

L$^+$ is a group of formula

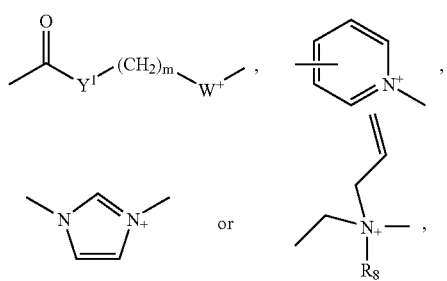

L$^-$ is a group of formula

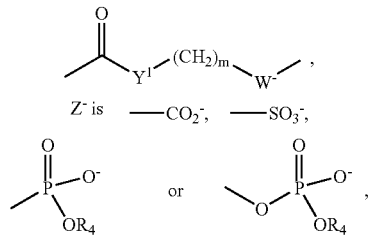

Z$^-$ is —CO$_2^-$, —SO$_3^-$,

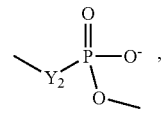

Z$^+$ is —N$^+$R$_5$R$_6$R$_7$,

R$_1$ and R$_8$ are independently hydrogen or methyl,

W$^+$ is —S$^+$R$_3$— or —N$^+$R$_2$R$_3$—,

W$^-$ is

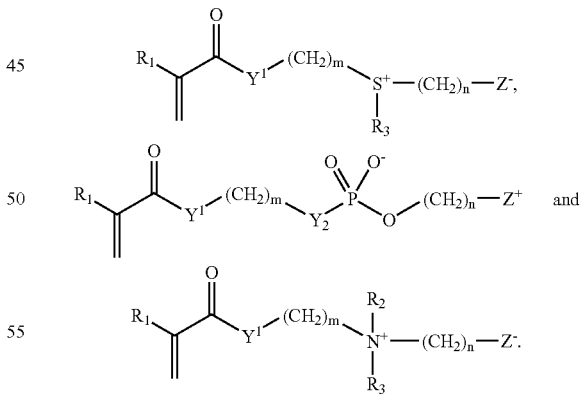

Y$_1$ and Y$_2$ are independently selected from —O— or —NR$_2$,

R$_2$, R$_3$, R$_4$, R$_5$, R$_6$ and R$_7$ are independently selected from hydrogen and straight or branched chain alkyl of 1 to 4 carbon atoms, m is 2 or 3, and n is 1-5.

Zwitterionic means a molecule containing cationic and anionic substituents in equal proportions, so that the molecule is net neutral in charge overall.

The present zwitterionic copolymers or cooligomers of this invention comprise for example monomer units derived from at least one zwitterionic monomer selected from the group consisting of Zwitterionic monomers are polymerizable molecules that contain cationic and anionic functionalities in equal proportions, so that the molecules are electrically net overall neutral. Examples are N,N-dimethyl-N-acryloyloxyethyl-N-(3-sulfopropyl)-ammonium betaine, N,N-dimethyl-N-acryloyloxyethyl-N-(2-carboxymethyl)-ammonium betaine, N,N-dimethyl-N-acrylamidopropyl-N-(3-sulfopropyl)-ammonium betaine,
N,N-dimethyl-N-acrylamidopropyl-N-(2-carboxymethyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'(trimethylammonim)ethyl phosphate,
[(2-acryloxyethyl)dimethylammonio]methyl phosphonic acid,
2-methacryloyloxyethyl phosphorylcholine (MPC),
2-[(3-acrylamidopropyl)dimethylammonio]ethyl 2'-isopropyl phosphate (AAPI),
1-vinyl-3-(3-sulfopropyl)imidazolium hydroxide,
(2-acryloxyethyl) carboxymethyl methylsulfonium chloride,
1-(3-sulfoproyl)-2-vinylpyridinium betaine,
N-(4-sulfobutyl)-N-methyl-N,N-diallylamine ammonium betaine (MDABS),
N,N-diallyl-N-methyl-N-(2-sulfoethyl) ammonium betaine, and the like.

The zwitterionic copolymers or cooligomers of this invention comprise for example monomer units derived from at least one zwitterionic monomer selected from the group consisting of
N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-methacryloyloxyethyl-N-(3-sulfopropyl)-ammonium betaine,
N,N-dimethyl-N-methacrylamidopropyl-N-(3-sulfopropyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'-(trimethylammonium)ethyl phosphate and
[(2-acryloylethyl)dimethylammonio]methyl phosphonic acid.

For example, the zwitterionic copolymers or cooligomers of this invention are comprise monomer units derived from at least one zwitterionic monomer selected from the group consisting of
N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-methacryloyloxyethyl-N-(3-sulfopropyl)-ammonium betaine and
N,N-dimethyl-N-methacrylamidopropyl-N-(3-sulfopropyl)-ammonium betaine.

For example, the present zwitterionic monomer is selected from the group consisting of
N,N-dimethyl-N-methacrylamidopropyl-N-(3-sulfopropyl)-ammonium betaine and
N,N-dimethyl-N-methacryloyloxyethyl-N-(3-sulfopropyl)-ammonium betaine, which are

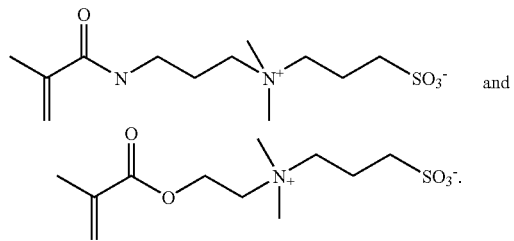

The zwitterionic monomers of this invention are prepared according to the methods described in U.S. Pat. No. 6,313,246.

They are prepared according to the following general schemes in an appropriate organic solvent at an appropriate temperature and reaction time:

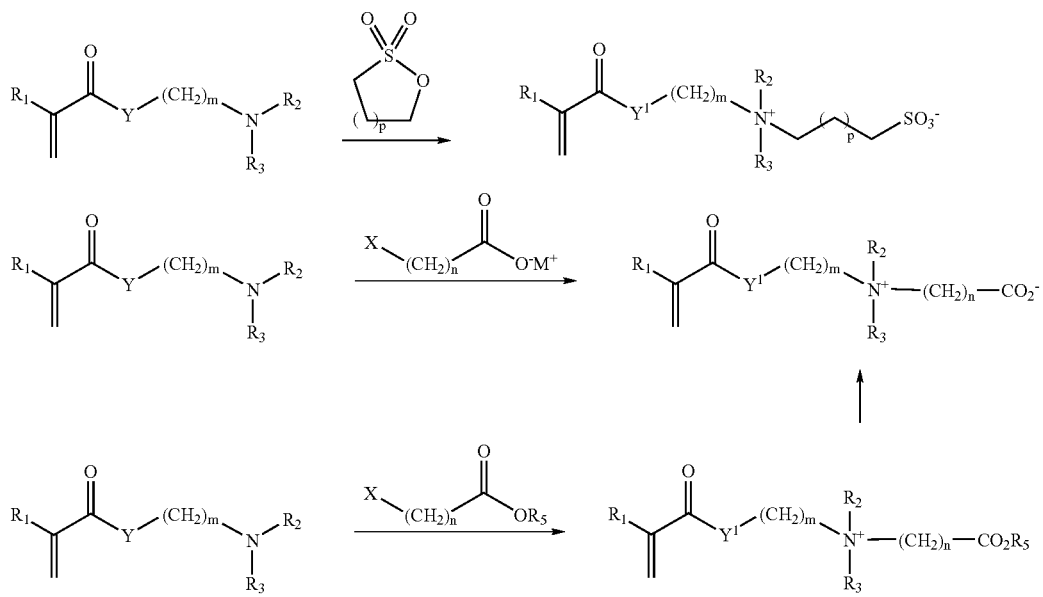

In the above synthetic schemes, X is any leaving group which may be displaced by the nucleophilic nitrogen of the amine reactants. For example, X may be halogen, tosylate, mesylate and the like. $M^+$ is a positive counterion, for example a metal ion such as sodium or potassium. Y is defined for $Y_1$ or $Y_2$ above and p is 1 or 2.

The hydroxy functional monomers are for example hydroxyalkyl acrylates, methacrylates, acrylamides, methacrylamides, N-substituted acrylamides or N-substituted (meth)acrylamides; or are monoacrylates or monomethacrylates of aromatic, aliphatic or cycloaliphatic polyols.

For example, the hydroxy functional monomers are methylol, 2-hydroxyethyl, 2- or 3-hydroxypropyl or 2-, 3- or 4-hydroxybutyl acrylate, methacrylate, acrylamide, methacrylamide, N-methylacrylamide, N-methyl(meth)acrylamide, N-isopropyl(meth)acrylamide, diacetone acrylamide or N-morpholinoacrylamide, or are monoacrylates or monomethacrylates of aromatic, aliphatic or cycloaliphatic polyols.

Aromatic polyols are typically hydroquinone, 4,4'-dihydroxydiphenyl, 2,2-bis(4-hydroxyphenyl)propane and cresols.

Aliphatic and cycloaliphatic polyols are for example alkylene polyols containing 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol, tripentaerythritol and sorbitol.

For example, the present hydroxy functional monomers are N-methylolacrylamide, N-methylolmethacrylamide, N-(2-hydroxypropyl)acrylamide, N-(2-hydroxypropyl)methacrylamide, 2-hydroxyethylacrylate, 2-hydroxyethyl(meth)acrylate (HEMA), 2-hydroxypropyl acrylate, 3-hydroxypropylacrylate, hydroxypropyl(meth)acrylate, hydroxybutylacrylate, hydroxybutyl(meth)acrylate, butanediol monovinyl ether, allyl alcohol, glycerol mono((meth)acrylate), neopentylglycol monoacrylate, hexamethyleneglycol monoacrylate, bisphenol A monoacrylate, 4-(2-acryloyloxyethoxy)-4'-hydroxyethoxy-diphenylpropane, 2-(2-acryloylethyl)-4,6-bis-(hydroxyethyl) isocyanurate, trimethylolpropane monoacrylate, trimethylolethane monoacrylate, trimethylolpropane monomethacrylate, trimethylolethane monomethacrylate, tetramethylene glycol monomethacrylate, triethylene glycol monomethacrylate, tetraethylene glycol monoacrylate, pentaerythritol monoacrylate, pentaerythritol monovinyl ether, dipentaerythritol monoacrylate, tripentaerythritol monoacrylate, 1,3-butanediol monoacrylate, 1,3-butanediol monomethacrylate, sorbitol monoacrylate, pentaerythritol-modified monoacrylate or 1-hydroxy-4-cyclohexane acrylate.

For example, the present hydroxy functional monomers are N-methylolacrylamide, N-methylolmethacrylamide, N-(2-hydroxypropyl)acrylamide, N-(2-hydroxypropyl)methacrylamide, 2-hydroxyethylacrylate, 2-hydroxyethyl(meth)acrylate (HEMA), hydroxypropyl acrylate, hydroxypropyl(meth)acrylate, hydroxybutylacrylate, hydroxybutyl(meth)acrylate, butanediol monovinyl ether, allyl alcohol or glycerol mono((meth)acrylate).

For example, the present hydroxy functional monomers are N-methylolacrylamide, N-(2-hydroxypropyl)methacrylamide, 2-hydroxyethyl(meth)acrylate (HEMA) or glycerol mono((meth)acrylate).

For instance, the present hydroxy functional monomer is N-methylolacrylamide.

Etherified hydroxy functional monomers are where one or more hydroxys are "etherified" (hydrogen of hydroxy replaced by), by for example an alkyl of 1 to 8 carbon atoms, phenyl or aralkyl of 7 to 17 carbon atoms. For example, the present hydroxy functional monomers may be etherified with methyl, ethyl, n-propyl, i-propyl, t-butyl or benzyl, or by mixtures thereof. If more than one hydroxy is present, the hydroxy functional monomer may be fully or partially etherified.

For example, the present zwitterionic copolymers or cooligomers comprise monomer united derived from hydroxy functional monomers.

Etherified hydroxy functional monomers may form the hydroxy functional monomers under the conditions of preparation of the zwitterionic copolymers and cooligomers, or under other conditions involved in preparation of the ink jet media systems. The etherified hydroxy functional monomers may otherwise perform similarly to the hydroxy functional monomers in the present compositions.

Alkyl is for instance methyl, ethyl, n-propyl, iso-propyl, n-, sec-, iso- and tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl or 2-ethylhexyl. Alkylene is the divalent equivalent of alkyl.

Aralkyl is for example benzyl, α-methylbenzyl, α,α-dimethylbenzyl or 2-phenylethyl. Aralkylene is the divalent equivalent of aralkyl.

Further ethylenically unsaturated monomers are for example acrylamide, methacrylamide, N-methylacrylamide, N,N-dimethyl(meth)acrylamide, N-isopropyl(meth)acrylamide, N-vinylformamide, N-vinylacetamide, N-vinyl-N-methylacetamide, N-vinyl-2-pyrrolidone, vinyl methylulfone, vinyl acetate, diacetone acrylamide, and acrylates such as methylmethacrylate, acrylic acid, amino acrylates and amino methacrylates and associative monomers. Amino methacrylates are for example dimethylaminoethylmethacrylate and tert-butylaminoethylmethacrylate. Associative monomers are for example stearyl ethoxy (20) methacrylate and stearyl ethoxy (10) allyl ether, poly(ethylene glycol)(meth)acrylate or poly(ethylene glycol)monomethyl ether mono(meth)acrylate.

Further ethylenically unsaturated monomers of this invention are for instance acrylamide, methacrylamide, methylmethacrylate, acrylic acid, stearyl ethoxy (20) methacrylate, stearyl ethoxy (10) allyl ether, poly(ethylene glycol)(meth) acrylate, poly(ethylene glycol)monomethyl ether mono (meth)acrylate, amino acrylates and amino methacrylates.

For example, the present further ethylenically unsaturated monomers are selected from the group consisting of acrylamide, methacrylamide and methylmethacrylate.

In zwitterionic polymers, all the polymer chains and segments within those chains are rigorously electrically neutral. Therefore, zwitterionic polymers represent a subset of polyampholytes, necessarily maintaining charge neutrality across all polymer chains and segments because both anionic charge and cationic charge are introduced within the same zwitterionic monomer.

The copolymers or cooligomers of this invention are prepared for example as in the disclosure of U.S. Pat. No. 6,313,246. They may be prepared for example by polymerization within a dispersed phase, for example inverse emulsion polymerization or dispersion polymerization. They may also be prepared by gel polymerization to produce the polymer product as a dry powder.

The zwitterionic copolymers or cooligomers of this invention may be of any molecular weight. They may for example have a molecular weight of about 10,000 to about 2 million.

The zwitterionic copolymers or cooligomers of this invention are advantageously employed in any layer of an ink jet ink recording media system. They may be employed in one coating layer, more than one of the layers, or in all of the layers.

The support itself may be the ink jet ink receptive layer. In this instance zwitterionic copolymers or cooligomers are advantageously employed as a coating directly on the support.

Accordingly, an object of this invention is an ink jet media system which comprises a coating directly on a support, wherein the coating comprises a present zwitterionic copolymer or cooligomer.

The ink jet media systems of this invention may comprise one or more than one ink jet receptive layer. The present zwitterionic copolymers or cooligomers may advantageously be employed in one or more than one of the receptive layers.

Accordingly, another object of the invention is an ink jet media system which comprises a support and at least one ink jet ink receptive layer, wherein one or more than one of said layers comprises a present zwitterionic copolymer or cooligomer.

Another object of the invention is an ink jet media system which comprises a support, at least one ink jet ink receptive layer, and a protective coating layer, which protective coating layer comprises a present zwitterionic copolymer or cooligomer.

Another object of the invention is an ink jet media system which comprises a support, at least one ink jet ink receptive layer, and a barrier layer between the support and the ink receptive layer or layers, wherein one or more than one of said receptive layers comprises a present zwitterionic copolymer or cooligomer.

It is also contemplated that the present zwitterionic copolymers or cooligomers are advantageously employed as a component of the ink jet ink.

Accordingly, another object of the invention is an ink jet media system which comprises ink jet ink and a present zwitterionic copolymer or cooligomer.

Supports are for example paper or a transparent plastic. Supports also include translucent plastics, matte plastics, opaque plastics, papers, and the like.

Supports may be for example cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly(ethylene terephthalate) (PET), polyimides, polyethers, polyvinyl chloride and polysulfonamides.

Barrier layers are advantageously employed between a paper support and the ink receptive layer. The barrier layer is for example polyolefin, for instance polyethylene. The barrier layer may also be a metal foil, such as aluminum foil.

Coating layers comprising the zwitterionic copolymers and cooligomers of this invention are cured with any conventional technique. For example, the present coating layers are cured air dried under ambient conditions, are oven-cured, or are photo-cured.

The zwitterionic copolymers and cooligomers of this invention may be blended with a wide variety of polymers or oligomers employed in ink jet media systems, for example neutral, anionic and cationic polyvinylalcohol (PVOH) and gelatin.

Polymers typically employed in ink jet media systems, generally in the ink receptive layer, include gelatin, starch, styrene butadiene rubber latex, nitrile butadiene rubber latex, polyethylene glycol, polyacrylamide, polyvinylalcohol, vinyl alcohol/vinyl acetate copolymer, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose and poly(N-vinyl pyrrolidone).

The zwitterionic copolymers and cooligomers of this invention are advantageously employed with cationic polymers, for example cationic polymers derived for example from one or more monomers selected from quaternary or acid salts of dialkylaminoalkyl acrylates and methacrylates, the quaternary or acid salts of dialkylaminoalkylacrylamides and methacrylamides, N,N-diallyldialkyl ammonium halides, Mannich products, and the like. Representative are N,N-dimethylaminoethylacrylate methyl chloride quaternary salt (DMAEA.MCQ), diallyldimethylammonium chloride (DADMAC), and the like.

Other suitable components may be present in the ink jet media systems and coatings of the present invention.

Additional components include for example pigments and fillers, for example amorphous and crystalline silica, aluminum trihydrate, kaolin, talcum, chalk, betonite, zeolites, glass beads, calcium carbonate, potassium sodium aluminum silicate, diatomaceous earth, silicates of aluminum and magnesium and mixtures thereof. Titanium doxide may also be used for certain applications. Organic particulates which may be employed include polyolefins, polystyrene, polyurethane, starch, poly(methyl methacrylate) and polytetrafluoroethylene. Pigments, fillers and organic particulates may be employed in coating layers of the present invention from about 0.1 to about 15% by weight, based on the weight of the dry coating. Polyolefins are for example polypropylene or polyethylene.

The present zwitterionic copolymers and cooligomers may advantageously be employed as a binder or part of a binder for a nanoporous or microporous ink jet media system. As known in the art, the binder may comprise a minority of the coating layer, for example less than about 40% by weight, for instance less than about 25% by weight, or less than about 10% by weight.

Paper substrates are for example advantageously coated with clay.

Additional additives also include surface active agents which control wetting or spreading action of the coating mixture, antistatic agents, thickeners, suspending agents, particulates which control the frictional properties or alter the reflective properties or act as spacers, pH controlling compounds, light stabilizers, antioxidants, humectants, bacteriostats, crosslinking agents, optical brighteners, etc.

Specific examples are starch, xanthan gum, quaternary ammonium salts, chitin, cellulose derivatives, and water soluble metal salts, for instance salts of Ca, Ba, Mg or salts of the rare earth metal series.

Stabilizer systems have been developed for the ink colorants. These stabilizers are also employed in the ink jet media systems of the present invention. They are disclosed for example in U.S. Pat. Nos. 5,782,963 and 5,855,655, the relevant disclosures of which are hereby incorporated by reference.

Additional additives that are advantageously employed as components of coating layers of an ink jet media system include those of the known classes of polymer stabilizers. For example, polymer stabilizers selected from the group consisting of ultraviolet light absorbers, hindered amine light stabilizers (HALS), and antioxidants.

For example, suitable additional additives are selected from:

Antioxidants selected from the group consisting of alkylated monophenols, alkylthiomethylphenols, hydroquinones and alkylated hydroquinones, tocopherols, hydroxylated thiodiphenyl ethers, alkylidenebisphenols, hindered phenols derived from benzyl compounds, hydroxybenzylated malonates, aromatic hydroxybenzyl compounds, triazine-based hindered phenols, benzylphosphonates, acylaminophenols, esters of β-(3,5-di-tert-butyl -4-hydroxyphenyl)propionic acid with mono- or polyhydric alcohols, esters of β-(5-tert-butyl-4-hydroxy-3-methylphenyl)propionic acid with mono- or polyhydric alcohols, esters of β-(3,5-dicyclohexyl-4-hydroxyphenyl)propionic acid with mono- or polyhydric alcohols, esters of 3,5-di-tert -butyl-4-hydroxyphenyl acetic acid with mono- or polyhydric alcohols, amides of β-(3,5-di-tert -butyl-4-hydroxyphenyl)propionic acid, ascorbic acid and aminic antioxidants, for example N,N'-di-isopropyl-p-phenylenediamine.

Antioxidants are for example phenolic antioxidants, for example salts of hydroxy substituted benzoic acids, for example salts of salicylic acid and salts of hydroxyl substituted benzoic acids further substituted with alkyl groups.

UV absorbers and light stabilizers selected from the group consisting of 2-(2-hydroxyphenyl)-2H-benzotriazoles, for example known commercial hydroxyphenyl-2H-benzotriazoles, 2-hydroxybenzophenones, esters of substituted and unsubstituted benzoic acids, for example 4-tertbutyl-phenyl salicylate, acrylates and malonates, oxamides, tris -aryl-o-hydroxyphenyl-s-triazines and sterically hindered amine stabilizers, for example N—H, N-acyl, N-oxyl, N-hydroxyl, N-alkyl, N-alkoxy and N-hydroxyalkoxy hindered amines.

For example, the nitroxyl, hydroxylamine and hydroxylamine salt stabilizers as disclosed in U.S. Pat. No. 6,254,724 are advantageously used in the recording media of the present invention. The relevant parts of U.S. Pat. No. 6,254,724 are hereby incorporated by reference.

For instance, UV absorbers are advantageously employed in protective coating layers of the present invention, whether the protective coating layer is part of the prepared recording media system or whether it is applied in a subsequent lamination step.

Another object of the present invention is a method for preparing an ink jet media system, which method comprises applying one or more coating layers on a support, wherein at least one of the coating layers comprises a present zwitterionic copolymer or cooligomer.

Any known method may be employed in the application of the individual coating layers of the present ink jet media systems. Known methods are for example Mayer bar coating, reverse roll coating, roller coating, wire-bar coating, dip-coating, air-knife coating, slide coating, curtain coating, doctor coating, flexographic coating, wound wire coating, slot coating, slide hopper coating and gravure coating.

Inks for ink jet printing are well known. These inks comprise a liquid vehicle and a dye or pigment dissolved or suspended therein. The liquid vehicle employed comprises water or a mixture of water and a water miscible organic solvent. The inks may also be vehicles for additives or other components that are to be incorporated into the recording media system.

Protective coating layers are typically about 1 micron thick. Supports are typically from about 12 microns to about 500 microns thick. Ink receptive layers are typically about 0.5 to about 30 microns thick.

The following Examples are for illustrative purposes only and are not to be construed as limiting the present invention in any manner whatsoever.

The present Examples demonstrate the excellent dry times and print quality of the of the ink jet media prepared according to the present invention.

The following media resin compositions are prepared. The copolymers are aqueous solution polymers.

A 60/25/15 parts by weight acrylamide/methoxy PEG 350 methacrylate/N,N-dimethyl -N-methacryloyloxyethyl-N-(3-sulphopropyl) ammonium betaine copolymer, prepared at 20% by weight solids in water, molecular weight about 250,000 (Example 2 of WO03037641).

B 60/25/15/2.5 parts by weight acrylamide/methoxy PEG 350 methacrylate/N,N-dimethyl-N-methacryloyloxyethyl-N-(3-sulphopropyl) ammonium betaine/N-methylolacrylamide copolymer, prepared at 30% by weight solids in water, molecular weight about 190,000.

C 60/25/15/2.5 parts by weight acrylamide/methoxy PEG 350 methacrylate/N,N-dimethyl-N-methacryloyloxyethyl-N-(3-sulphopropyl) ammonium betaine/N-methylolacrylamide copolymer, prepared at 20% by weight solids in water, molecular weight about 250,000.

D 60/25/15/1.0 parts by weight acrylamide/methoxy PEG 350 methacrylate/N,N-dimethyl-N-methacryloyloxyethyl-N-(3-sulphopropyl) ammonium betaine/N-methylolacrylamide copolymer, prepared at 30% solids in water, molecular weight about 190,000.

E 60/25/15/5.0 parts by weight acrylamide/methoxy PEG 350 methacrylate/N,N-dimethyl-N-methacryloyloxyethyl-N-(3-sulphopropyl) ammonium betaine/N-methylolacrylamide copolymer, prepared at 30% solids in water, molecular weight about 190,000.

PEG is polyethylene glycol.

The resins of the present invention, B-E, are prepared as is resin A.

The following media resin formulations are prepared, depending on the supplied percent solids of the resins:

| Resin, 20% solids | 90 g | Resin, 30% solids | 90 g |
| --- | --- | --- | --- |
| Glycerin | 0.45 g | Glycerin | 0.68 g |
| Lodyne ® S-100 | 0.40 g | Lodyne ® S-100 | 0.40 g |
| Distilled Water | 7.30 g | Distilled Water | 7.14 g |
| Ethanol | 1.85 g | Ethanol | 1.78 g |
| TOTAL | 100 g | TOTAL | 100 g |

Lodyne ® S-100 is an amphoteric fluorosurfactant

A set of the above formulations are employed at an unadjusted pH of 5.5-6.0. A separate set of formulations are adjusted to a final pH of between 3.5-4.0 with citric acid.

The above aqueous solutions/suspensions of media polymers are applied to polyethylene coated paper sheet using the appropriate draw down bar to generate a 15 gsm (grams per square meter) coating after drying in an oven, 3 minutes at 230° F. The same coating weight and drying conditions are employed for formulations of either pH range.

Various color patterns are printed onto the coated papers and subjected to specific tests, depending on the type of printer used, designed to measure characteristics important to the type of ink employed. All prints are made at the ambient conditions of 23° C. and 32% relative humidity.

When the media resin has good glycol compatibility, glycol smear is reduced, likewise, the media exhibits better color coalescence properties.

The Epson printer is a piezo printer. The Hewlett Packard printer is a thermal printer.

EXAMPLE 1

A blue patch at 200% density is printed using an Hewlett Packard 990 cxi printer. The coating's performance is rated in terms of dry time and resistance to glycol smear. The time until the printed coating becomes resistant to physical deformation via low pressure rub test (thumb pressure) is recorded as "dry time".

Glycol smear is measured after the sample is dry. After specified time intervals (from printing) slightly more thumb pressure is applied to cause a smear in the color. A 0-5 rating system is used to rank the severity of glycol smear. Results are below.

0=no smear at all, 1=very slight, 2=slight, 3=noticeable, 4=easily noticeable, 5=severe

| Resin | Dry Time | Glycol Smear After dry time | Glycol Smear After 10 mins | Glycol Smear After 4 hrs |
|---|---|---|---|---|
| A pH 5.5 | 6 mins | 5 | 5 | 5 |
| B pH 5.5 | 8 mins | 3 | 3 | 3 |
| C pH 5.5 | 8 mins | 4 | 3 | 3 |
| D pH 5.5 | 8 mins | 3 | 3 | 4 |
| E pH 5.5 | 5 mins | 2 | 2 | 3 |
| A pH 4.0 | 7 mins | 4 | 4 | 5 |
| B pH 4.0 | 6 mins | 3 | 2 | 4 |
| C pH 4.0 | 4 mins | 2 | 2 | 2 |
| D pH 4.0 | 8 mins | 4 | 3 | 5 |
| E pH 4.0 | 5 mins | 2 | 2 | 1 |

The resins of the present invention exhibit excellent glycol smear results. Dry times are also very good.

EXAMPLE 2

A step wedge plot (a series of color blocks with increasing print densities, 10%, 20% etc.) is printed using an Epson 890 printer (piezo printer) and the coating's performance is judged in terms of dry time (smudge resistance versus time and image transfer after dry time) and print quality (ink coalescence for secondary colors).

The step wedge in the center of the test plot is used to rate coalescence and image transfer. For example if ink coalescence occurs at 50% through to 100% print density in the green then the result is reported as 50%+. Minimal ink coalescence is desirable. Likewise for image transfer. If only the 100% print density portion of the step wedge transfers then this is a better result than if it transfers at 50%+ print density.

Little coalescence is seen in red on any sample; green and blue are worst cases.

The resins of the present invention exhibit minimal image transfer and/or ink coalescence.

EXAMPLE 3

Photostability

Color sqares of yellow, magenta and cyan at both 50% and 100% optical densities are printed onto the coated papers using the HP 970 Cxi and Epson 890 printers. L,a,b color and optical density values are then recorded before and after 48 and 96 hours of exposure in an Atlas Ci65 Xenon Weather-Ometer, inner and outer borosilicate filters, 50° C., 50% RH, irradiance 0.35 wm$^2$ at 340 nm. All samples performed equally well.

What is claimed is:

1. An ink jet recording media system that comprises a support and one or more coating layers thereon, wherein at least one coating layer comprises a zwitterionic copolymer or zwitterionic cooligomer which comprises monomer units derived from
    at least one zwitterionic monomer selected from the group consisting of N,N-dimethyl-N-methacrylamidopropyl-N-(3-sulfopropyl)-ammonium betaine and N,N-dimethyl-N-methacryloyloxyethyl-N-(3-sulfopropyl)-ammonium betaine,
    N-methylolacrylamide and
    at least one further ethylenically unsaturated monomer selected from the group consisting of acrylamide, methacrylamide and methylmethacrylate.

2. A recording media system according to claim 1 in which the zwitterionic copolymers or zwitterionic cooligomers comprise from about 2 to about 5 weight percent N-methylolacrylamide.

3. A recording media system according to claim 1 in which the zwitterionic copolymer or zwitterionic cooligomer comprises monomer units derived from
    at least one zwitterionic monomer selected from the group consisting of N,N-dimethyl-N-methacrylamidopropyl-N-(3-sulfopropyl)-ammonium betaine and N,N-dimethyl-N-methacryloyloxyethyl-N-(3-sulfopropyl)-ammonium betaine,
    N-methylolacrylamide,
    acrylamide and
    poly(ethylene glycol)monomethyl ether mono(meth)acrylate.

| Resin | Dry Time (Black 100%) | Coalescence Green | Coalescence Blue | Coalescence Black | Image Transfer Primary colors | Image Transfer Secondary colors |
|---|---|---|---|---|---|---|
| A pH 5.5 | 14 min | 70% + density | 50-80% | 60-80% | 50%+ | 60%+ |
| B pH 5.5 | 16 min | 70% + density | 60-80% | 60-80% | 90%+ | 80%+ |
| C pH 5.5 | 6 min | 80% + density | 50-80% | 60-80% | 100% | 100% |
| D pH 5.5 | 15 min | 70% + density | 60-80% | 70-80% | 80%+ | 80%+ |
| E pH 5.5 | 13 min | 60% + density | 60-80% | 60-80% | 90%+ | 90%+ |
| A pH 4.0 | 14 min | 70% + density | 50-70% | 60-80% | 60%+ | 50%+ |
| B pH 4.0 | 14 min | 70% + density | 60-80% | 60-80% | 100% | 100% |
| C pH 4.0 | 4 min | none | 70% | 80% | 100% | 100% |
| D pH 4.0 | 17 min | 80% + density | 60-80% | 60-80% | 50%+ | 80%+ |
| E pH 4.0 | 8 min | none | 70% | 80% | none | 100% (black only) |

4. A recording media system according to claim 1 which comprises a coating directly on a support,
 wherein the coating comprises the zwitterionic copolymer or zwitterionic cooligomer.

5. A recording media system according to claim 1 which comprises a support and at least one ink jet ink receptive layer,
 wherein one or more than one of said receptive layers comprises a zwitterionic copolymer or zwitterionic cooligomer.

6. A recording media system according to claim 5, in which one or more than one of said receptive layers further comprises at least one polymer selected from the group consisting of gelatin, starch, styrene butadiene rubber latex, nitrile butadiene rubber latex, polyethylene glycol, polyacrylamide, polyvinylalcohol, vinyl alcohol/vinyl acetate copolymer, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose, poly(N-vinyl pyrrolidone) and cationic polymers.

7. A recording media system according to claim 5 which further comprises a barrier layer between the support and the ink receptive layer or layers.

8. A recording media system according to claim 7 which comprises a protective coating layer.

9. A recording media system according to claim 7 which comprises a protective coating layer,
 wherein said protective coating layer comprises the zwitterionic copolymer or zwitterionic cooligomer.

10. A recording media system according to claim 5 which comprises a protective coating layer.

11. A recording media system according to claim 5 which comprises a protective coating layer,
 wherein said protective coating layer comprises the zwitterionic copolymer or zwitterionic cooligomer.

12. A recording media system according to claim 1 which comprises a support, at least one ink jet ink receptive layer, and a protective coating layer,
 wherein said protective coating layer comprises the zwitterionic copolymer or zwitterionic cooligomer.

13. A recording media system according to claim 1 which further comprises ink jet ink.

14. A recording media system according to claim 1 which further comprises one or more pigments, fillers or organic particulates selected from the group consisting of amorphous silica, crystalline silica, aluminum trihydrate, kaolin, talcum, chalk, betonite, zeolite, glass beads, calcium carbonate, potassium sodium aluminum silicate, diatomaceous earth, silicates of aluminum, silicates of magnesium, titanium doxide, polyolefins, polystyrene, polyurethane, starch, poly(methyl methacrylate) and polytetrafluoroethylene.

15. A recording media system according to claim 1 which further comprises one or more additives selected from the group consisting of surface active agents, antistatic agents, thickeners, suspending agents, pH controlling compounds, light stabilizers, antioxidants, humectants, bacteriostats, crosslinking agents and optical brighteners.

16. A recording media system according to claim 15 in which the additives are selected from the group consisting of phenolic antioxidants, hydroxybenzotriazole ultraviolet light absorbers, benzophenone ultraviolet light absorbers, hydroxyphenyltriazine ultraviolet light absorbers and hindered amine light stabilizers.

17. A recording media system according to claim 16 in which the hindered amine light stabilizers are selected from the group consisting hindered nitroxyl, hindered hydroxylamine and hindered hydroxylamine salt stabilizers.

18. A recording media system according to claim 16 in which the phenolic antioxidants are salts of hydroxy substituted benzoic acids.

19. A recording media system according to claim 1 in which said support comprises cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly(ethylene terephthalate) (PET), polyimides, polyethers, polyvinyl chloride or polysulfonamides.

20. A recording media system according to claim 1 in which said support is paper or transparent poly(ethylene) terephthalate.

21. A recording media system according to claim 1 which comprises a nanoporous or microporous coating layer.

* * * * *